United States Patent [19]

Miura

[11] Patent Number: 4,512,447
[45] Date of Patent: Apr. 23, 1985

[54] HYDRAULIC DAMPER

[75] Inventor: Ieaki Miura, Kanagawa, Japan

[73] Assignee: Tokico Ltd., Kanagawa, Japan

[21] Appl. No.: 450,546

[22] Filed: Dec. 16, 1982

[30] Foreign Application Priority Data

Dec. 18, 1981 [JP] Japan .................. 56-189560[U]

[51] Int. Cl.³ .............................................. F16F 9/348
[52] U.S. Cl. ................................ 188/322.15; 188/320
[58] Field of Search ........... 188/282, 317, 320, 322.13, 188/322.15, 322.22

[56] References Cited

U.S. PATENT DOCUMENTS

| | | | |
|---|---|---|---|
| 2,316,924 | 4/1943 | Whisler. | |
| 3,029,903 | 4/1962 | Wasdell | 188/320 |
| 3,837,445 | 9/1974 | Pierle. | |
| 4,060,155 | 11/1977 | Duckett | 188/282 |

FOREIGN PATENT DOCUMENTS

| | | |
|---|---|---|
| 1249017 | 8/1967 | Fed. Rep. of Germany. |
| 2917958 | 1/1980 | Fed. Rep. of Germany. |
| 1385373 | 12/1964 | France .................. 188/322.15 |
| 147939 | 11/1981 | Japan .................... 188/322.15 |
| 2100833 | 1/1983 | United Kingdom. |

Primary Examiner—Duane A. Reger
Attorney, Agent, or Firm—Wenderoth, Lind & Ponack

[57] ABSTRACT

A hydraulic damper includes a cylinder containing hydraulic liquid therein, a piston working in the cylinder and partitioning the interior of the cylinder into first and second liquid chambers, a piston rod secured to the piston and extending to the outside, and a disc valve mounted on each side of the piston for generating damping force. The disc valve exposed to the first liquid chamber comprises at least three mutually overlapping annular discs. The outer circumference of a first disc which is located contiguous to the piston is easily deflectable, and a second disc which is located contiguous to the first disc has at least one opening, one end of which is communicated permanently with the first liquid chamber. The liquid flow flowing through the opening is intercepted by the outer circumference of the first disc when the piston moves toward the second liquid chamber, and a liquid flow passing through the opening is established due to the deflection of the first disc when the piston moves toward the first liquid chamber, thereby decreasing the damping force.

2 Claims, 11 Drawing Figures

HYDRAULIC DAMPER

BACKGROUND OF THE INVENTION

This invention relates to a hydraulic damper and, particularly to a hydraulic damper of the kind including a cylinder containing hydraulic liquid therein, a piston working in the cylinder and partitioning the interior thereof into first and second liquid chambers, a piston rod secured to the piston and extending to the outside, and a disc valve mounted on each side of the piston for generating the damping force. Usually, the disc valve exposed to the first liquid chamber opens when the piston moves toward the second liquid chamber and generates a damping force in that condition, and when the piston moves toward the first liquid chamber, the disc valve provided in the second liquid chamber acts to generate a damping force.

When a hydraulic damper of this kind is used in a suspension system of a vehicle such as an automobile wherein the damper is installed between the sprung mass and the unsprung mass of the vehicle, it is sometimes required that the damping force in the contraction stroke of the damper drastically be decreased compared with the damping force in the extension stroke of the damper, so as to improve the driving comfort of the vehicle.

The damping force of the disc valve is usually determined by the rigidity of the valve disc, thus, it is usually possible to determine the damping force as desired by changing the thickness and the material of the valve disc. However, when the desired damping force is not so large, the dimensional tolerance in the thickness of the valve disc has a large affect on the damping force.

SUMMARY OF THE INVENTION

The invention has been made in view of the aforesaid circumstances and the object of the invention is to provide a hyraulic damper of the kind aforementioned with the damping force in one direction of the movement of the piston being reduced sufficiently compared with the damping force in the other direction of the piston movement, with the construction thereof being simple and the assembling operation therefor being easy.

According to the invention, there is provided a disc valve of the kind aforementioned and wherein the disc valve exposed to the first liquid chamber comprises at least three mutually overlapping annular discs, with the outer circumference of a first disc which is located contiguous to the piston being easily deflectable, and a second disc which is located contiguous to the first disc having at least one opening, one end of which is communicated permanently with the first liquid chamber. The opening in the second disc is closed by the first disc when the piston moves toward the second liquid chamber, and the opening is opened due to the deflection of the first disc when the piston moves toward the first liquid chamber.

In utilizing the hydraulic damper according to the invention in a suspension system of a vehicle, it is preferable to reduce the damping force in the contraction stroke of the damper compared with that in the extension stroke, whereby the driving comfort of the vehicle can be improved.

BRIEF DESCRIPTION OF THE DRAWINGS

Further objects and advantages of the invention will become apparent from the following detailed description taken with reference to accompanying drawings exemplifying preferred embodiments of the invention, in which.

DETAILED DESCRIPTION OF THE PREFERRED EMBODIMENTS

Figure 1:
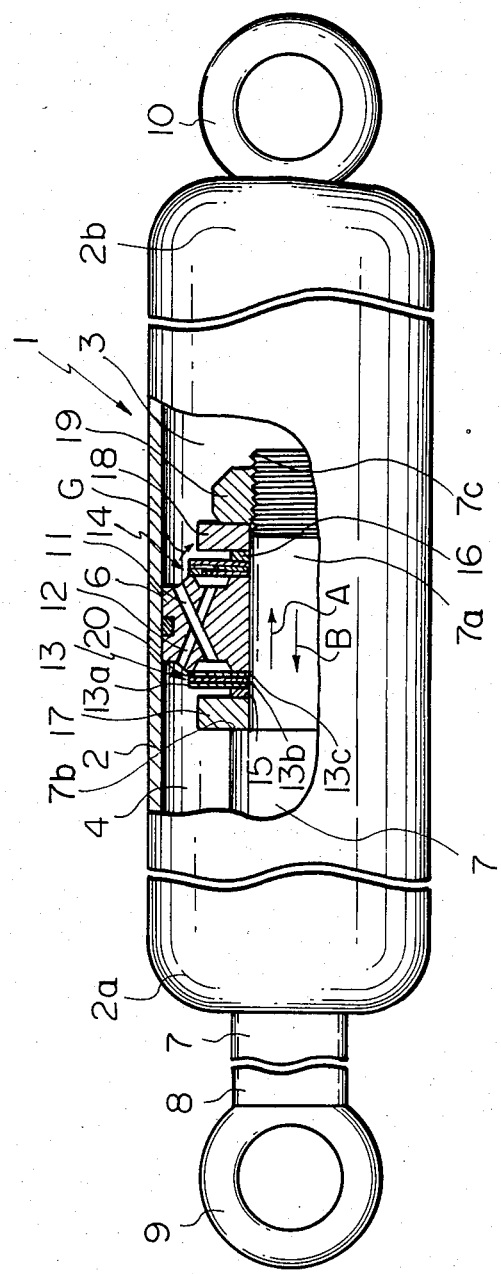
FIG. 1 is a partially sectional explanatory view of a hydraulic damper according to the invention.
Figure 2:
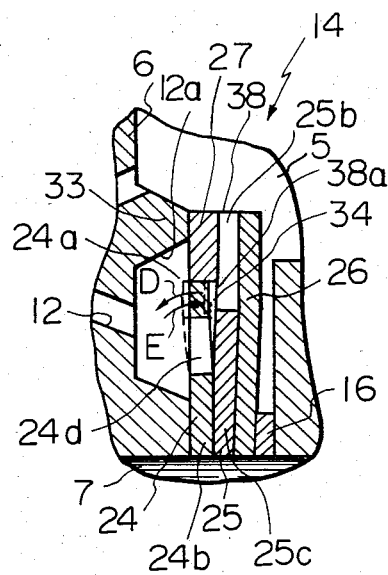
FIG. 2 is an enlarged view of a part of FIG. 1.

FIGS. 1-4 show a hydraulic damper according to a first preferred embodiment of the invention which comprises a cylinder 2, a piston 6 slidably fitted in the cylinder 2 and defining two liquid chambers 3 and 4 within the cylinder 2, and a piston rod 7 secured to the piston 6 and extending through the liquid chamber 4 and sealingly and slidingly through one end 2a of the cylinder 2 to the outside. A mounting member 9 is secured to the projecting end 8 of the piston rod 7 for mounting the damper to such as a body of a vehicle. Another mounting member 10 is secured to the other end 2b of the cylinder 2 for mounting the damper to such as a wheel axle of the vehicle. There are provided on opposite sides of the piston 2 annular recesses, and the annular recess on the side of the liquid chamber 4 is communicated permanently with the liquid chamber 3 through a plurality of passages 11, only one of which is shown in FIG. 1. Similarly, an annular recess 12a provided on the side of the liquid chamber 3 is communicated permanently by a plurality of passages 12 with the liquid chamber 4. The passages 11 and 12 are independently formed through the piston 6. The annular recesses constitute respectively valve seats for disc valves 13 and 14 for generating the damping force of the damper. The disc valve 13 comprises three mutually overlapping annular discs 13a, 13b and 13c which are located by a retainer 15 and a washer 17. The annular disc 13c has one or more cut-outs in the outer circumference thereof to constitute a permanent orifice 20 through which the liquid chambers 3 and 4 are permanently communicated. The disc valve 13 generates the damping force in the contraction stroke of the damper.

Similarly, the disc valve 14 comprises a plurality of mutually overlapping annular discs (the details of which will hereinafter be described) and an annular retainer 16 and a washer 18. The disc valves 13 and 14 and the piston 6 are secured to a reduced diameter end portion 7a of the piston rod 7 by a nut 19 which threadingly engages with external screw threads 7c on the tip end of the reduced diameter portion 7a. It will be understood that the assembling operation is very simple since the nut 19 acts to clamp the washer 17, the retainer 15, the valve discs 13a, 13b and 13c, the piston 6, the valve discs constituting the disc valve 14, the retainer 16 and the washer 18 against a shoulder 7b which is defined on the piston rod 7.

Figure 5:
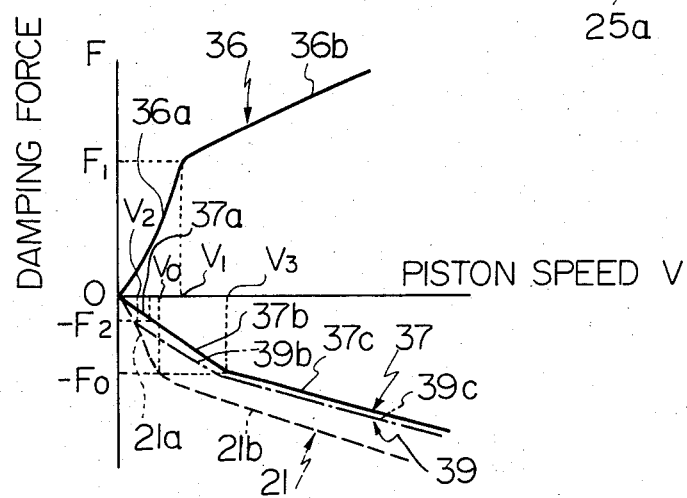
FIG. 5 is a diagram showing the relationship between the damping force and the piston speed.

The disc valve 13 essentially has a damping force characteristic as depicted by broken line 21 in FIG. 5 in the contraction stroke of the damper. When the piston speed in the direction of arrow A (FIG. 1) is small, the liquid in the chamber 3 flows through the passages 11 and the orifice 20 to the chamber 4, and generates the damping force as depicted by the portion 21a of the broken line 21 in FIG. 5. When the piston speed exceeds $V_0$ the outer circumferences of valve discs 13a, 13b and 13c are deflected in the direction separating from the piston 6, and the damping force characteristics in this condition are depicted by the portion 21b of the broken line 21.

Figure 3:
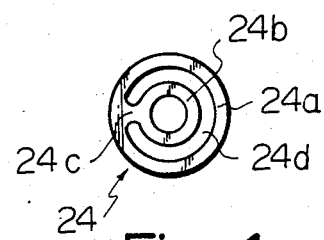
FIGS. 3 and 4 are front views of discs incorporated in the hydraulic damper of FIG. 2.
Figure 4:
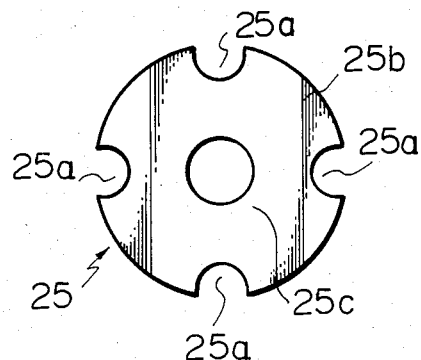

The disc valve 14 comprises, according to the invention, three mutually overlapping annular discs 24, 25 and 26 and an annular disc 27 which is thicker than the annular disc 24. The disc 24 which is contiguous to the piston 6 has an inner circumferential portion 24b, an outer circumferential portion 24a and a bridge portion 24c as shown in FIG. 3. The inner circumferential portion 24b is clamped between the piston 6 and the inner circumferential portion of the disc 25, and the outer circumferential portion 24a slidably engages with the inner circumference of the annular disc 27. Further, the diameter of the disc 24 is smaller than that of the disc 25. The disc 24 constitutes a first disc according to the invention, and the outer circumferential portion 24a is easily deflectable in the directions of arrows D and E with respect to the inner circumferential portion 24b.

The disc 25 constituting a second disc according to the invention has a predetermined number (four in FIG. 4) of cut-outs 25a in the outer circumferential portion 25b which permanently communicate with the liquid chamber 3, and the outer circumferential portion 25b normally abuts with the disc 27 to press the same against an annular rim 33 of the recess 12b in the piston 6. The rim 33 acts as a valve seat of the disc valve 14. The disc 27 may be supported on the outer circumference of the disc 24 but, alternately, the disc 27 may integrally be connected to the disc 25 by such as bonding. The thickness of the disc 27 is larger than that of the disc 24, thus, a generally wedge shaped small clearance 34 is formed between the outer circumferential portion 24a of the disc 24 and adjacent surface of the disc 25.

In a modified form, the thickness of the disc 27 is equal to that of the disc 24 and, in such case, the small clearance 34 is diminished. The cut-out portions 25a of the disc 25 are normally covered by the outer circumferential portion 24a of the disc 24. The number, the location and the configuration of the cut-outs 25a may be determined as desired.

The disc 26 constituting a third disc according to the invention backs up the disc 25, with the diameter of disc 26 being equal to that of the disc 25.

The discs 24, 25, 26 and 27 are preferably formed of a resilient material such as a spring steel and may be formed by a process such as punching.

The disc valve 14 having the constitution as described heretofore cooperates with the disc valve 13 to generate the damping force as depicted by solid lines 36 and 37 in FIG. 5.

In the extension stroke of the damper wherein the piston 6 moves in the direction of arrow B or toward the liquid chamber 4, and when the piston speed is small, the liquid in the chamber 4 flows into the chamber 3 through the orifice 20 and the passages 11, and the damping force is depicted by a portion 36a. The outer circumferential portion 24a of the disc 24 deflects in the direction of arrow E and intercepts the communication between the liquid chamber 3 and the passages 12. When the piston speed exceeds a predetermined speed $V_1$, the disc valve 14 opens to make an annular passage between the valve seat 33 and the disc 27. The damping force at that condition is shown by a portion 36b.

In the contraction stroke and when the piston speed is low, the small clearance 34 serves also as an orifice in addition to the orifice 20, thereby generating a damping force as depicted by a portion 37a. When the piston speed is increased by a small amount, the outer circumferential portion 24a of the disc 24 deflects in the direction of arrow D and the liquid flow passing through the cut-out portions 25a and the passages 12 increases, which cooperates with the flow passing through the orifice 20 to generate the damping force as depicted by a portion 37b in FIG. 5. When the piston speed further increases to exceed a predetermined speed $V_3$, the disc valve 13 opens thereby generating the damping force as defined in a portion 37c in FIG. 5.

It will be understood that the flow passing through the cut-outs 25a in the disc 25 is limited by the effective minimum passage area which is usually defined by the total opening 38 in the outer circumference of the disc 25 and, thus, the amount of the deflection of the disc 24 does not increase excessively. Further, the portion 37c in FIG. 5 is generally parallel to the portion 21b.

As described heretofore, the damping force in the contraction stroke of the damper can substantially be reduced by providing the flexible disc 24 on the disc valve 14 which normally provides the damping force in the extension stroke of the damper. Therefore, when the damper is incorporated in the suspension system of the vehicle, the driving comfort of the vehicle is improved.

When the small clearance 34 is not provided, the damping force in the contraction stroke of the damper is defined by chain lines 39c and 39b with the lines 39b merging with the broken line portion 21a at a piston speed $V_2$.

Figure 6:
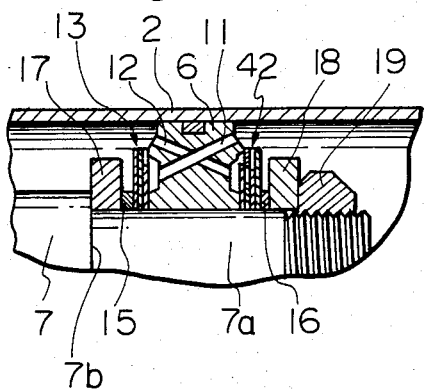
FIG. 6 is a partial sectional view of a hydraulic damper according to a second embodiment of the invention.
Figure 7:
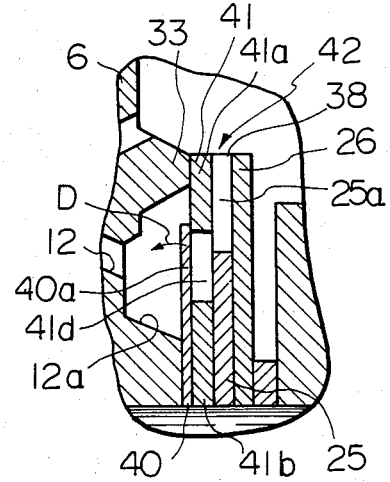
FIG. 7 is an enlarged view showing the essential portion of FIG. 6.
Figure 8:
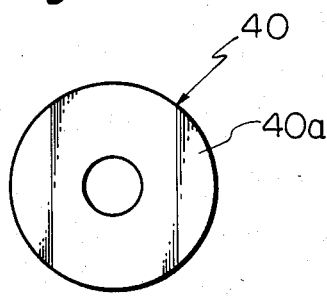
FIGS. 8-11 are front views of discs incorporated in the hydraulic damper of FIG. 7.
Figure 9:
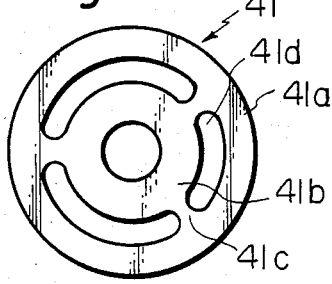
Figure 10:
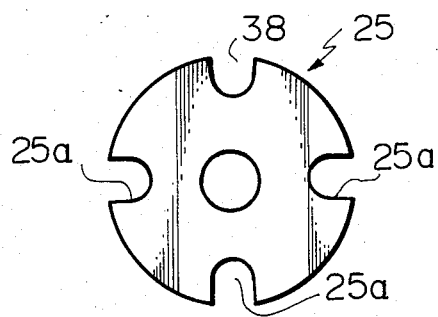

FIGS. 6 and 7 show a second embodiment of the invention wherein the disc valve 14 in the first embodiment is replaced by a disc valve 42. The disc valve 42 comprises four mutually overlapping annular discs 40, 41, 25 and 26 which are shown respectively in FIGS. 8, 9, 10 and 11. The disc 40 is formed of an annular solid plate of relatively thin thickness such that the outer circumferential portion 40a thereof is easily deformable with respect to the inner circumferential portion which is clamped between the piston 6 and the disc 41. The disc 40 constitutes the first disc according to the invention.

Figure 11:
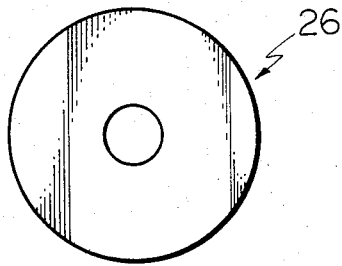

The disc 41 has at least one arcuate opening 41d similar to the disc 24 in the first embodiment, but the opening 41 does not reduce the rigidity or increase the flexibility of the disc 41 and serves as a simple opening which is normally covered by the outer circumferential portion 40a of the disc 40. The opening 41d in the disc 41 is permanently communicated with cut-out portions 25a in the disc 25. Thus, the disc 41 and the disc 25 in the second embodiment cooperate to constitute the second disc according to the invention. The disc 26 shown in FIG. 11 is similar to the disc 26 in FIG. 2.

The damping force in the second embodiment is generally depicted by lines 36 and 39 in FIG. 5.

In the illustrated embodiments, the hydraulic dampers are shown as of the single tube type, but the invention can equally be applied to a dual tube type hydraulic damper.

As described heretofore, according to the invention, a disc valve which is located on one side of the piston for normally generating the damping force when the piston moves toward the other side comprises at least three mutually overlapping annular discs. Further, a first disc located contiguous to the piston has an easily deformable outer circumferential portion, and a second disc located contiguous to the first disc has at least one opening, one end of which is permanently communicated with the liquid chamber on the one side of the piston and the other end of which is normally closed by the first disc. When the piston moves toward the one side of the piston, the opening in the second disc opens by deflecting the first disc whereby the damping force generated by the other disc valve can substantially be decreased. Particularly, the gradient in the rising up portions such as 37a, 37b and 39b shown in FIG. 5 is very gentle. The construction is simple, the assembling operation is easy, and further, it is possible to effectively prevent the generation of noisy sounds which would be caused by liquid flow through a restricted passage and to prevent the generation of cavitation in the liquid flow. Further, the ratio between the damping force in the extension and contraction strokes of the damper particularly in the range of low piston speed can be determined as desired.

The embodiments wherein the damping force in the contraction stroke is reduced as compared with that in the extension stroke of the damper is particularly advantageous in applying the damper in a vehicle suspension system, whereby the driving comfort can be improved.

What is claimed is:

1. A hydraulic damper comprising:
   a cylinder containing hydraulic liquid therein;
   a piston working in said cylinder and partitioning the interior of said cylinder into first and second liquid chambers;
   a piston rod secured to said piston and extending to the exterior of said cylinder;
   a disc valve mounted on each side of said piston for generating damping forces;
   said disc valve exposed to said first liquid chamber comprising at least three mutually overlapping annular discs;
   the outer circumference of a first said disc which is located contiguous to said piston being easily deflectable;
   a second said disc which is located contiguous to said first disc having at least one opening, one end of which is communicated permanently with said first liquid chamber;
   said opening being closed by said first disc when said piston moves toward said second liquid chamber, and said opening being opened due to deflection of said first disc when said piston moves toward said first liquid chamber; and
   said first disc having large and small diameter coaxial annular portions which are integrally connected by at least one radial bridge portion, whereby said large diameter annular portion can easily deflect with respect to said small diameter portion.

2. A hydraulic damper as claimed in claim 1, wherein the outer circumference of said first disc is guided by a fourth annular disc which is interposed between said piston and said second disc and which moves together with said second disc when said piston moves toward said second liquid chamber with said second disc being deflected in a direction to separate from said piston.

* * * * *